United States Patent
Zahid et al.

(10) Patent No.: US 12,488,533 B2
(45) Date of Patent: Dec. 2, 2025

(54) SYSTEMS, METHODS, AND NON-TRANSITORY COMPUTER-READABLE MEDIUMS FOR DISPLAYING A VIRTUAL SPACE USING USER INFORMATION

(71) Applicant: Toyota Connected North America, Inc., Plano, TX (US)

(72) Inventors: Imad Zahid, Carrollton, TX (US); Shravanthi Denthumdas, Frisco, TX (US); Mark Anthony McClung, Celina, TX (US)

(73) Assignee: Toyota Connected North America, Inc., Plano, TX (US)

( * ) Notice: Subject to any disclaimer, the term of this patent is extended or adjusted under 35 U.S.C. 154(b) by 169 days.

(21) Appl. No.: 18/186,553

(22) Filed: Mar. 20, 2023

(65) Prior Publication Data
US 2024/0320908 A1 Sep. 26, 2024

(51) Int. Cl.
*G06T 17/00* (2006.01)
*G06F 3/04815* (2022.01)
*G06Q 30/0207* (2023.01)

(52) U.S. Cl.
CPC .......... *G06T 17/00* (2013.01); *G06F 3/04815* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 9,412,203 B1* | 8/2016 | Garcia, III | H04N 7/181 |
| 9,697,503 B1* | 7/2017 | Penilla | B60L 50/16 |
| 10,957,099 B2 | 3/2021 | Hoover | |
| 11,218,522 B1* | 1/2022 | Yerli | H04N 7/155 |
| 11,367,281 B2 | 6/2022 | Furlan et al. | |
| 11,423,619 B2* | 8/2022 | Tan | G06T 19/003 |
| 11,798,244 B1* | 10/2023 | Witchey | G06T 19/003 |
| 2003/0046179 A1 | 3/2003 | Anabtawi et al. | |
| 2005/0277455 A1* | 12/2005 | Chudley | A63F 13/12 463/6 |

(Continued)

OTHER PUBLICATIONS

Arushi Bhalla; "Everything About Virtual Car Showrooms—21st Century Dealership Essential"; Jul. 26, 2022.

(Continued)

*Primary Examiner* — Jason A Pringle-Parker
(74) *Attorney, Agent, or Firm* — Dinsmore & Shohl LLP (57) ABSTRACT

Systems, methods, and non-transitory computer-readable medium for displaying a virtual space are provided. The system for displaying a virtual space includes a graphical user interface and a controller. The controller is programmed to receive user information from a user profile, wherein the user information comprises a user location, a user design preference, and at least one user metric. The controller is also programmed to determine display conditions based on the user information, determine user accessibility to virtual features based on the at least one user metric, and display the virtual space including the virtual features on the graphical user interface based on the display conditions and the user accessibility. The virtual space is displayed as a virtual 3D rendered image.

19 Claims, 4 Drawing Sheets

(56) References Cited

U.S. PATENT DOCUMENTS

| | | | | |
|---|---|---|---|---|
| 2007/0268299 | A1* | 11/2007 | Jung | G06Q 30/00 345/581 |
| 2008/0104018 | A1* | 5/2008 | Xia | G06F 9/451 |
| 2008/0221776 | A1* | 9/2008 | McClellan | B60R 16/0236 701/115 |
| 2009/0170614 | A1* | 7/2009 | Herrmann | G07F 17/3237 463/43 |
| 2009/0259539 | A1* | 10/2009 | Dawson | G06Q 30/02 705/26.1 |
| 2010/0169798 | A1* | 7/2010 | Hyndman | A63F 13/30 715/757 |
| 2011/0010998 | A1* | 1/2011 | Elliott | E05D 15/101 49/260 |
| 2011/0072367 | A1* | 3/2011 | Bauer | G06F 3/04815 715/757 |
| 2012/0124471 | A1* | 5/2012 | Gusky | H04W 4/21 715/705 |
| 2014/0129080 | A1* | 5/2014 | Leibowitz | B60R 16/0231 705/26.7 |
| 2014/0344014 | A1* | 11/2014 | MacInnis | G06Q 30/0201 705/7.29 |
| 2015/0193726 | A1* | 7/2015 | Simmons | G06Q 10/087 705/28 |
| 2015/0379775 | A1* | 12/2015 | Kuehne | G06F 3/012 345/633 |
| 2018/0067641 | A1* | 3/2018 | Lerner | H04L 51/52 |
| 2019/0012603 | A1* | 1/2019 | Miller | G06N 5/04 |
| 2019/0073703 | A1* | 3/2019 | Aggarwal | G06Q 30/0283 |
| 2019/0251622 | A1 | 8/2019 | Wiedmeyer et al. | |
| 2019/0369742 | A1* | 12/2019 | Ghazanfari | G06T 19/003 |
| 2019/0384865 | A1* | 12/2019 | Jaiswal | H04L 67/535 |
| 2020/0134652 | A1* | 4/2020 | DeLuca | G06F 9/451 |
| 2021/0065275 | A1* | 3/2021 | Denthumdas | B60K 35/10 |
| 2021/0312552 | A1* | 10/2021 | Simpson | H04W 4/029 |
| 2022/0012950 | A1 | 1/2022 | Price et al. | |
| 2022/0188891 | A1 | 6/2022 | Sanor et al. | |
| 2022/0331698 | A1* | 10/2022 | Krietzman | A63F 13/69 |
| 2022/0392312 | A1* | 12/2022 | Marks | G07F 17/3267 |
| 2024/0095418 | A1* | 3/2024 | Lopatine | G09B 9/05 |

OTHER PUBLICATIONS

Fatema-Tuz-Zohra Nabila; How to Create A Virtual Car Showroom—Virtual reality (VR) in Automotive Industry [2022], Aug. 8, 2022.

* cited by examiner

SYSTEMS, METHODS, AND NON-TRANSITORY COMPUTER-READABLE MEDIUMS FOR DISPLAYING A VIRTUAL SPACE USING USER INFORMATION

TECHNICAL FIELD

The present disclosure relates to systems, methods, and non-transitory computer-readable mediums for displaying a virtual space.

BACKGROUND

Graphical user interfaces display a computer-generated environment to a user. This may be done through a conventional graphical user interface of a user device such as a phone or tablet. The computer-generated environment may also be displayed through a virtual reality (VR) headset, which creates a sense of presence and immersion within the computer-generated environment. Conventional computer-generated environments are generalized and do not take into account preferences of the user when displaying the computer-generated environment. However, customization of the computer-generated environment plays a critical role in a nature of the experience a user has with the user device.

Accordingly, a need exists for systems, methods, and non-transitory computer-readable mediums that display a virtual space customized to user preferences.

SUMMARY

The present disclosure provides systems, methods, and non-transitory computer-readable mediums for displaying a virtual space. The systems, methods, and non-transitory computer-readable mediums display a virtual space customized to user preferences by receiving information from a user profile and displaying virtual features based on the information from the user profile. The user information may include a user location, user design preference, or at least one user metric. With a customized virtual space, the user may have a more enjoyable and customized user experience when viewing the virtual space through the graphical user interface.

In one or more embodiments, a computer implemented system for displaying a virtual space is provided. The system includes a graphical user interface and a controller. The controller is programmed to receive user information from a user profile. The user information includes a user location, a user design preference, and at least one user metric. The controller is also programmed to determine display conditions based on the user information, determine user accessibility to virtual features based on the at least one user metric, and display the virtual space including the virtual features on the graphical user interface based on the display conditions and the user accessibility. The virtual space is displayed as a virtual 3D rendered image.

In another embodiment, a computer implemented method for displaying a virtual space is provided. The method includes receiving user information from a user profile, wherein the user information comprises a user location, a user design preference, and at least one user metric. The method further includes determining display conditions based on the user information, determining user accessibility to virtual features based on the at least one user metric, and displaying the virtual space including the virtual features on a graphical user interface based on the display conditions and the user accessibility. The virtual space is displayed as a virtual 3D rendered image.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure provides systems, methods, and non-transitory computer-readable mediums for displaying a virtual space. The systems, methods, and non-transitory computer-readable mediums display a virtual space customized to user preferences by receiving information from a user profile and displaying virtual features based on the information from the user profile. The user information may include a user location, user design preference, or at least one user metric. The systems, methods, and non-transitory computer-readable mediums may further use a virtual reality (VR) device, an external user application, or a vehicle processor to display and customize the virtual space to the user. Customization of the virtual space through the utilization of user preferences generates a more familiar, customized, and enjoyable virtual space for the user. Moreover, connection to a user profile and real-time customization of the virtual space and offering of discounts provides a significant advantage over prior, non-customizable systems.

Figure 1:
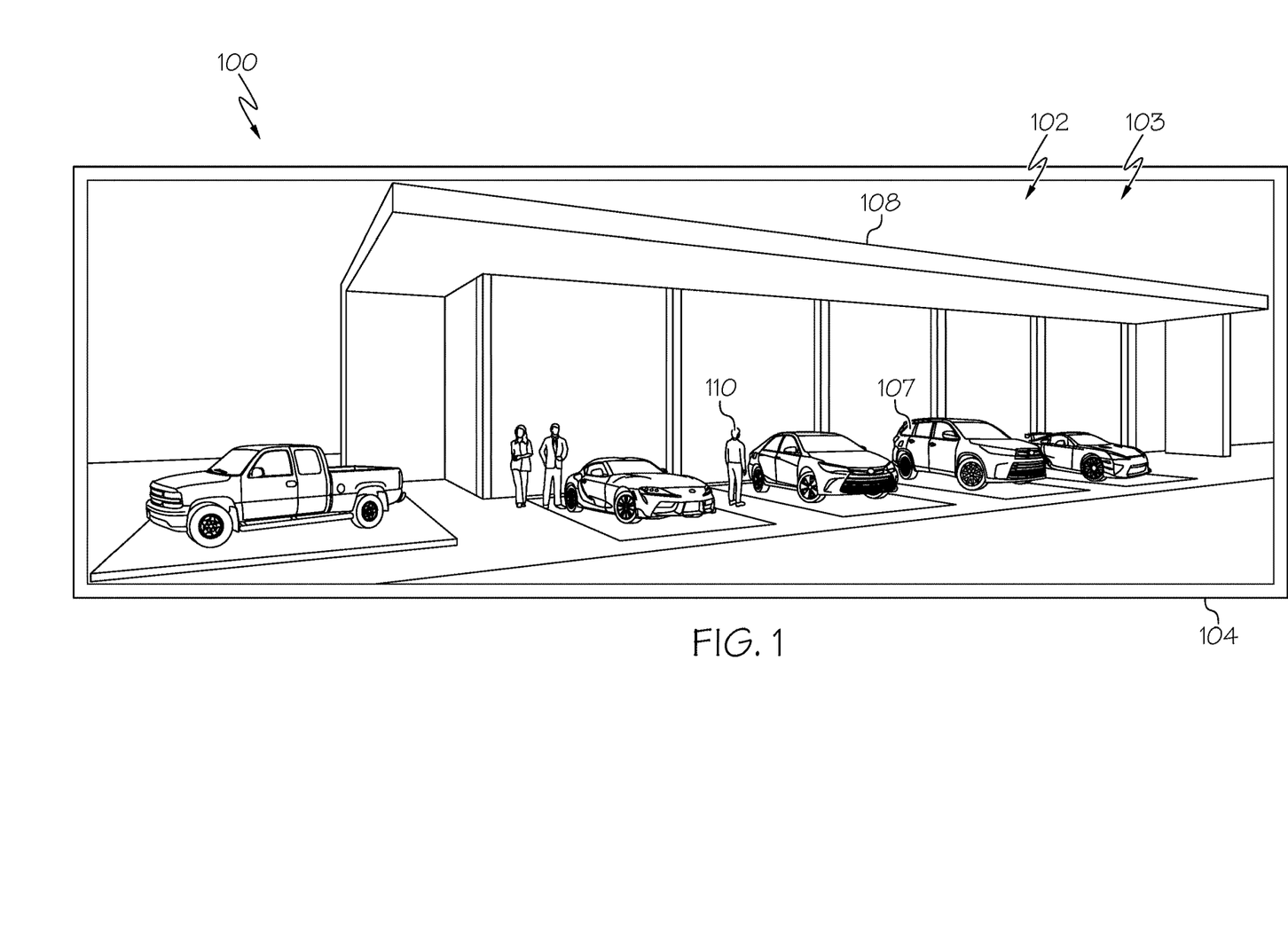
FIG. 1 depicts an exemplary virtual space displayed by a computer implemented system for displaying the virtual space, according to one or more embodiments shown and described herein.

FIG. 1 depicts an exemplary virtual space 102 displayed by a computer implemented system 100 for displaying the virtual space 102, according to one or more embodiments shown and described herein.

Referring to FIG. 1, the virtual space 102 displayed by a system 100 may be displayed through a graphical user interface 104. The virtual space 102 may be displayed as a 3D rendered image. A controller 106 (discussed further below), may be programmed to display the virtual space 102 on the graphical user interface 104. The virtual space 102 may be any number of environments the user wishes the graphical user interface 104 to display. The virtual space 102 may include a virtual shopping center, a virtual concert, or any other suitable virtual space 102 that the user wishes top display. In the non-limiting example in FIG. 1, the virtual space 102 is depicted as a virtual car dealership 103. In embodiments, the virtual space 102 may be based on real images. For example, real images of a dealership may be stored in a memory of the present system. The real images may be collected from publicly accessible data, e.g., images from social networking service, images from official homepages of the dealership, and the like. The controller 106 of the present system may transform the 2D real images into 3D rendered images that may be used for virtual reality experience.

The virtual car dealership 103 may render virtual vehicles 107, virtual buildings 108, or virtual users 110 in the virtual space 102. The virtual car dealership 103 may appear similar to a physical car dealership. The virtual car dealership 103 may be designed to replicate a particular physical car dealership. For example, the present system obtains images of actual vehicles displayed on the property of the physical car dealership, and renders 3D images of corresponding vehicles based on the obtained images. As another example, the present system obtains the inventory information of the particular physical car dealership and renders 3D virtual vehicles based on the inventory information. The inventory information may include detailed information about the vehicles such as make, models, colors, accessories, and the like. The virtual car dealership 103 may also be a generic representation of the physical car dealership. In other embodiments, the virtual car dealership 103 may be a computer generated car dealership that does not exist as a physical car dealership. In some embodiments, one or more icons, texts, or other graphical elements may indicate descriptions of vehicles, prices of vehicles, or other relevant information in the virtual car dealership 103. A type/style of virtual car dealership 103 is displayed may depend on user information received from a user profile (as described further below). In embodiments, the rendering of the 3D virtual vehicles may be dynamically updated based on the status of physical vehicles. For example, when a customer is test driving a physical vehicle at a dealership, the physical vehicle may transmit, to the controller 106, its current status such as information that the physical vehicle is current driving, or the current location of the physical vehicle. The controller 106 may update the rendering of the virtual vehicle 107 corresponding to the physical vehicle based on the information physical vehicle is currently driving or the current location of the physical vehicle. For example, the controller 106 may update the color of the virtual vehicle 107 to gray to indicate that the virtual vehicle is not available. As another example, the controller 106 may remove the virtual vehicle 107 from the virtual dealership.

Figure 2:
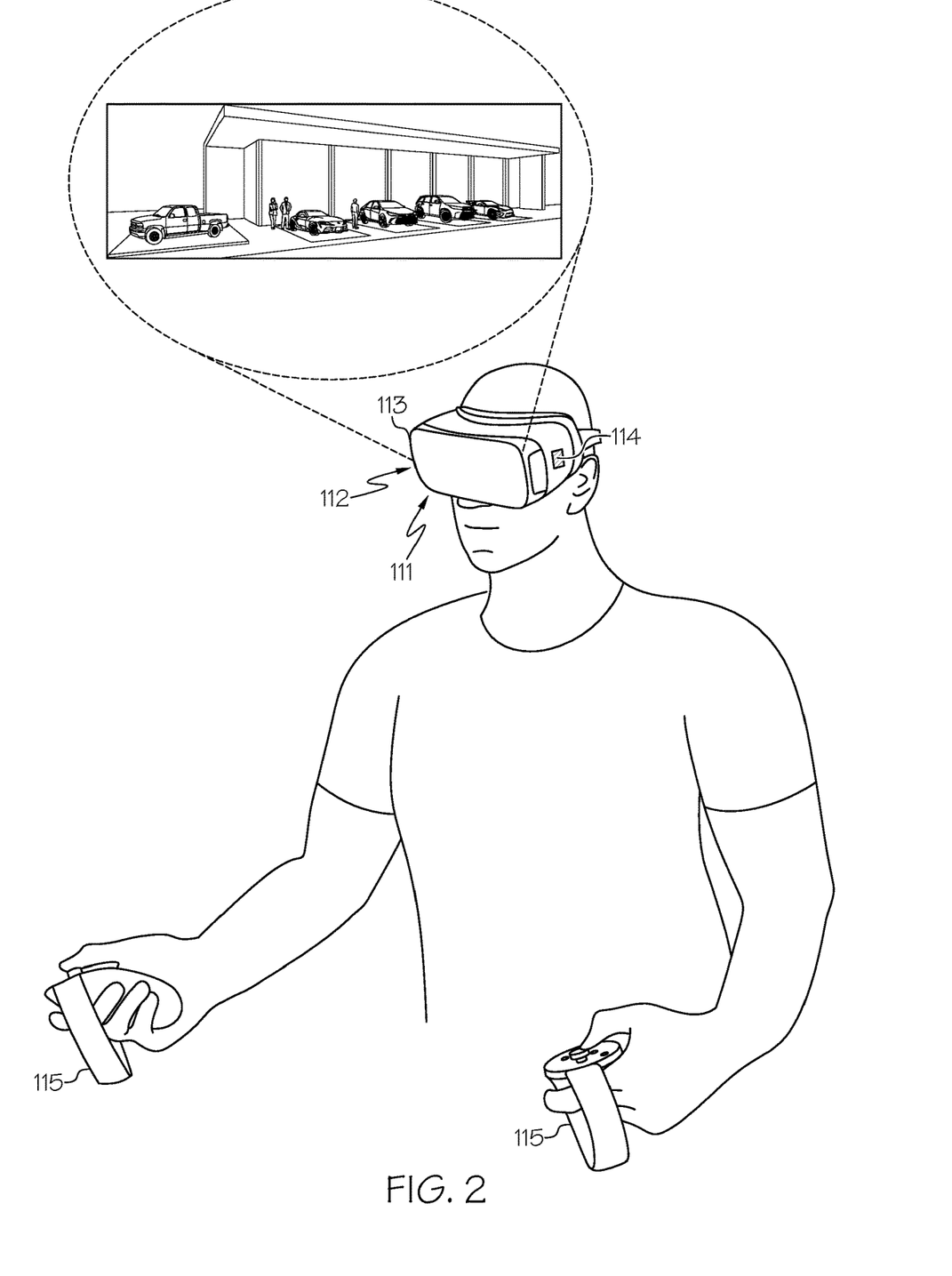
FIG. 2 illustrates an example of a user viewing a virtual car dealership through a virtual reality device, according to one or more embodiments shown and described herein.

FIG. 2 illustrates an example of the user viewing the virtual car dealership 103 through a VR device 112, according to one or more embodiments described and illustrated herein.

The graphical user interface 104 may be a user interface of a user device 111. The user device 111 may be a phone, tablet, a computer, or any other device that may display the graphical user interface 104. The user device 111 may include the graphical user interface 104 and the controller 106. In some embodiments, the user device 111 may include the VR device 112. The VR device 112 may include a VR headset 113 that the user wears to view the virtual space 102. In the exemplary embodiment of FIG. 2, the user is viewing the virtual car dealership 103. However, as discussed hereinabove, the user may also view virtual shopping centers, virtual concerts, virtual sports games, or any other suitable virtual space 102 the user wishes to view on the graphical user interface 104 of the user device 111.

The user may interact with the virtual space 102. Referring again to FIG. 1, the user may interact with the virtual space 102 through the graphical user interface 104 when the user device 111 includes a graphical user interface 104 that is touch-screen. Thus, the user may select certain objects, change the view, or navigate the virtual space 102 through the graphical user interface 104 of the user device 111. In some embodiments, the user device 111 may include a microphone 114, such that the user can speak commands into the user device 111 in order to interact with the virtual space 102. Referring again to FIG. 2, in embodiments in which the user device 111 is the VR device 112, the VR device 112 may include hand controllers 115, allowing the user can interact with the virtual space 102 through the hand controllers 115.

Figure 3:
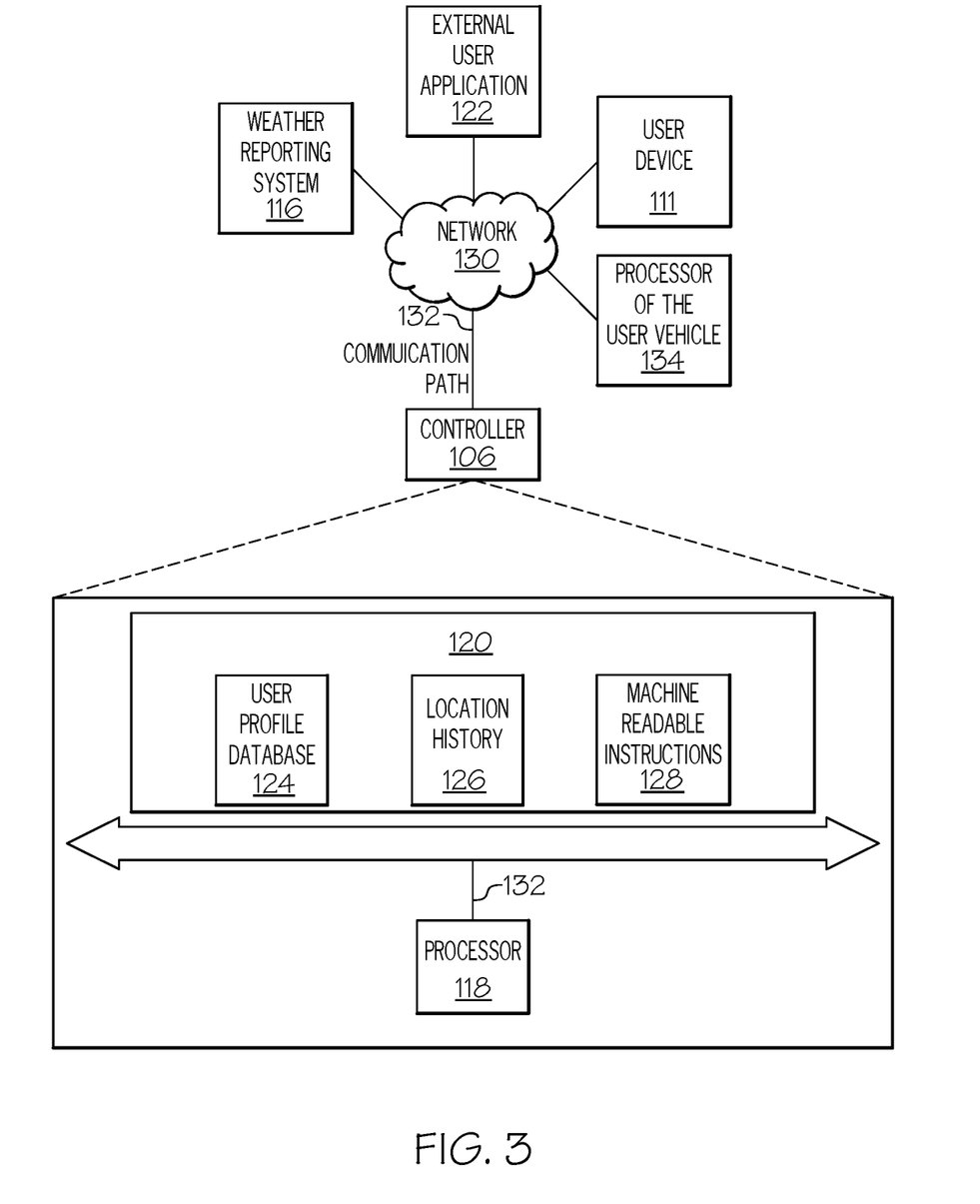
FIG. 3 depicts a schematic diagram of the system for displaying the virtual space, according to one or more embodiments shown and described herein.

FIG. 3 depicts a schematic diagram of the system 100 for displaying the virtual space 102, according to one or more embodiments shown and described herein.

As discussed hereinabove, the virtual space 102 may be displayed through the controller 106. The controller 106 may be included in a server, e.g., a cloud server, an edge server, and the like. The controller 106 may be programmed to receive user information from a user profile, determine display conditions based on the user information, determine user accessibility to virtual features based on at least one user metric, and display the virtual space 102 on the graphical user interface 104. One or more of the controller 106 functions may be executed in real time. Referring now to FIG. 3, the controller 106 may include a processor 118 and a memory unit 120. The processor 118 can be any device capable of executing machine-readable and executable instructions 128. The processor 118 may be a controller, an integrated circuit, a microchip, a computer, or any other computing device. The processor 118 is coupled to a communication path 132 that provides signal interconnectivity between various modules of the system 100. The communication path 132 may communicatively couple any number of processors 118 with one another, and allow the modules coupled to the communication path 132 to operate in a distributed computing environment. Each of the modules may operate as a node that may send and/or receive data. As used herein, the term "communicatively coupled" means that coupled components are capable of exchanging data signals with one another such as electrical signals via a conductive medium, electromagnetic signals via air, optical signals via optical waveguides, and the like.

The communication path 132 may be formed from any medium that is capable of transmitting a signal such as conductive wires, conductive traces, optical waveguides, or the like. In some embodiments, the communication path 132 may facilitate the transmission of wireless signals, such as WiFi, Bluetooth®, Near Field Communication (NFC), and the like. The communication path 132 may be formed from a combination of mediums capable of transmitting signals. In one embodiment, the communication path 132 comprises a combination of conductive traces, conductive wires, connectors, and buses that cooperate to permit the transmission of electrical data signals to components such as processors, memories, sensors, input devices, output devices, and communication devices. The communication path 132 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory unit 120 may contain non-transitory computer-readable medium comprising RAM, ROM, flash memories, hard drives, or any device capable of storing machine-readable and executable instructions 128 such that the machine-readable and executable instructions 128 can be accessed by the processor 118. The machine-readable and executable instructions 128 may comprise logic or algorithm(s) written in any programming language of any generation (e.g., 1GL, 2GL, 3GL, 4GL, or 5GL) such as, for example, machine language that may be directly executed by the processor 118, or assembly language, object-oriented programming (OOP), scripting languages, microcode, etc., that may be compiled or assembled into machine-readable and executable instructions 128 and stored in the memory unit 120. The machine-readable and executable instructions 128 may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The processor 118 along with the memory unit 120 may operate as the controller 106 for the system 100.

Still referring to FIG. 2, the controller 106 may be communicatively coupled to the user device 111 (depicted in FIG. 1), a processor of the user vehicle 134 (discussed further below), a weather reporting system 116 (discussed further below), or each of the foregoing, by a network 130. In one embodiment, the network 130 may include one or more computer networks (e.g., a personal area network, a local area network, or a wide area network), cellular networks, satellite networks and/or a global positioning system and combinations thereof. The controller 106 may be communicatively coupled to the network 130 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

As discussed hereinabove, the controller 106 may receive user information from the user profile. The user information on the user profile may be manually entered by the user through the user device 111. In other embodiments, the user may input a name and address into the user profile, and the user information may be autocompleted based on a user profile database 124 stored on the memory unit 120 that stores user information. The controller 106 may also be communicatively coupled to an external user application 122.

The external user application 122 may be an application installed on the user device 111. The external user application 122 may include a video-streaming application, a gaming application, a ride-share application, or any other external user application 122 that may be installed on the user device 111. The controller 106 may receive user application metrics from the external user application 122. The user application metrics and the external user application 122 are discussed further below.

The user information may include a user location, a user design preference, current vehicle information, at least one user metric, or any other user information that may be stored on the user profile. The user location may be determined through a global positioning system (GPS) of the user device 111. The user location may include a country, state, city, or zip code that the user is located in. In some embodiments, the user may set the user location to a location different than that of the physical location of the user determined through the GPS of the user device 111. For example, the user may set the location as New York City, even though the GPS of the user device 111 has determined that the user location is West Virginia.

The user information may also include user demographic information on the user profile. The user demographic information may include age, gender, marital status, or any other demographic information that may be stored on the user profile. The user demographic information may assist the controller 106 in determining the display conditions to display on the graphical user interface 104, as discussed further below.

The user design preference may include preferences on how the user prefers the virtual space 102 to appear. In some embodiments, the user design preference includes a preferred architecture. For example, the user may select the preferred architecture from a plurality of architectures listed on the graphical user interface 104. The plurality of architectures may include modern, colonial, Victorian, or any other architecture type that the user may prefer. The user preferences may also include a brightness of colors (i.e., light or dark colors), a time of day, or any other preference the user may have when viewing the virtual space 102. The virtual space 102 may be designed to include the preferred architecture. For example, if the preferred architecture is modern, the virtual buildings 108 may be of a modern architecture. On the other hand, if the preferred architecture is colonial, the virtual buildings 108 in the virtual space 102 may be of a colonial architecture.

A plurality of user profiles may be included on the user profile database 124 stored on the memory unit 120. The plurality of user profiles include user information corresponding to the users in each of the user profiles. In some embodiments, the user design preference for a new user may be automatically determined by the controller 106 by comparing the user information of the user profile of the new user with the user information stored on the plurality of user profiles of users that have similar background as the new user on the user profile database 124. For example, the controller 106 may recognize that user profiles in the plurality of user profiles that are male, 50 years old, and located in Cleveland, Ohio, often select a colonial architecture from the plurality of architectures. Based on this recognition, the controller 106 may automatically determine the user design preference as the colonial architecture type for the user profile with similar user information (i.e., male, 48 years old, located in Columbus, Ohio).

The at least one user metric may be based on metrics of a user vehicle. The user vehicle may be a vehicle including an automobile or any other passenger or non-passenger vehicle such as, for example, a terrestrial, aquatic, and/or airborne vehicle. In some embodiments, the user vehicle may be an autonomous driving vehicle. The user vehicle may be an autonomous vehicle that navigates its environment with limited human input or without human input. The processor of the user vehicle 134 may be communicatively coupled to the controller 106 (depicted in FIG. 3). As such, the controller 106 may monitor a plurality of driving metrics recorded by the processor of the user vehicle 134 and classify the plurality of driving metrics as the at least one user metric. For example, the at least one user metric may include a number of miles the user vehicle has been driven. The number of miles the user vehicle has been driven may include a total number of miles that the user vehicle has been driven. The number of miles of the user vehicle may be transmitted from the processor of the user vehicle 134 to the controller 106 in real time. In other embodiments, the number of miles the user vehicle has been driven may be a number of miles the user vehicle has been driven since the user has purchased the user vehicle (in scenarios where the user buys a used vehicle) or an average number of miles the user vehicle is driven per day, week, month, or year. The at least one user metric may also include a number of consecutive days, weeks, or months the user vehicle has been driven. For example, the at least one user metric may be that the user vehicle is driven every day, or that the user vehicle is driven only Monday through Friday.

The processor of the user vehicle 134 connected to the controller 106 may include a GPS of the user vehicle. Therefore, the at least one user metric may include a location history 126 of the user vehicle. The location history 126 of the user vehicle may be stored on the memory unit 120 (as depicted in FIG. 3) and may include routes the user vehicle has driven, a number of counties or states the user vehicle has been driven to, a number of National Parks the user vehicle has been driven in, or any other suitable location history 126 of the user vehicle.

As discussed hereinabove, after receiving the user information from the user profile, the controller 106 may also be programmed to determine display conditions based on the user information. The display conditions correspond to how the virtual space 102 appears to the user through the graphical user interface 104. The display conditions may directly correspond to the user information from the user profile in order to replicate an environment the user is in. For example, if the user information includes that the user location as Denver, Colorado, and the user design preference is modern, the display conditions may include a mountainous background and virtual buildings 108 in the virtual space 102 may be rendered in a modern architectural style. The display conditions may also include a weather condition or a time of day.

The time of day may change the display conditions in the virtual space 102, such as an amount of sunlight. For example, if the time of day is 9 PM, no sunlight may be displayed in the virtual space 102 and the display conditions may be adjusted to nighttime. The weather condition may also effect the display conditions in the virtual space 102. The weather condition may be retrieved from the weather reporting system 116 communicatively coupled to the controller 106 through the communication path 132 (depicted in FIG. 2). The controller 106 may obtain information from the weather reporting system 116 by querying the weather reporting system 116 with the user location. The controller 106 may then adjust the display conditions in the virtual space 102 based on the weather conditions at the user location.

The controller 106 may also be programmed to determine user accessibility to virtual features based on the user information or the at least one user metric. The virtual features may include features of the virtual space 102. For example, the virtual features may include a locked virtual room. The locked virtual room may include discounts that a user can select from once the locked virtual room has become unlocked. The virtual features such as the locked virtual room may only be unlocked/accessible if the user information or the at least one user metric meets a threshold condition.

In some embodiments, the user accessibility to the virtual features (i.e. the threshold condition) may be based on whether the user vehicle has entered within a defined location. For example, user accessibility to virtual features of a beach background in the virtual space 102 may be based on whether the user vehicle has travelled within 5 miles of an ocean coastline. In other embodiments, user accessibility to virtual features of the virtual space 102 may be based on whether the user vehicle has entered within a certain number of defined locations. For example, accessibility of virtual features in the virtual space 102 may be based on whether the user vehicle has entered within the defined location of 5 National Parks. Upon the user vehicle entering the defined location of 5 National Parks, a notification that the virtual features are now accessible may be transmitted to the user device 111 or to the processor of the user vehicle 134. The user device 111 or the user vehicle 134 may display the accessible virtual features on a screen of the user device 111 or the user vehicle 134.

In other embodiments, the user accessibility to virtual features may be based on the at least one user metric of the number of miles the user vehicle has been driven. For example, a virtual room in the virtual space 102 described above may be locked if the user vehicle has been driven under 100,000 miles. When the user vehicle has been driven 100,000 miles or over, the virtual room may be unlocked and the user may access the virtual room. The unlocked virtual room may include discounts offered to the user, such as a no down-payment offer on a new vehicle, a low interest rate on financing, or $1,000 off a new vehicle. The user may be able to select one, or all of the discounts offered to the user in the unlocked virtual room. When the user vehicle drives over 100,000 miles and the virtual room is unlocked while the user vehicle is driving, the controller 106 may provide a route to a nearby dealership that offers discounts to the user vehicle.

Figure 4:
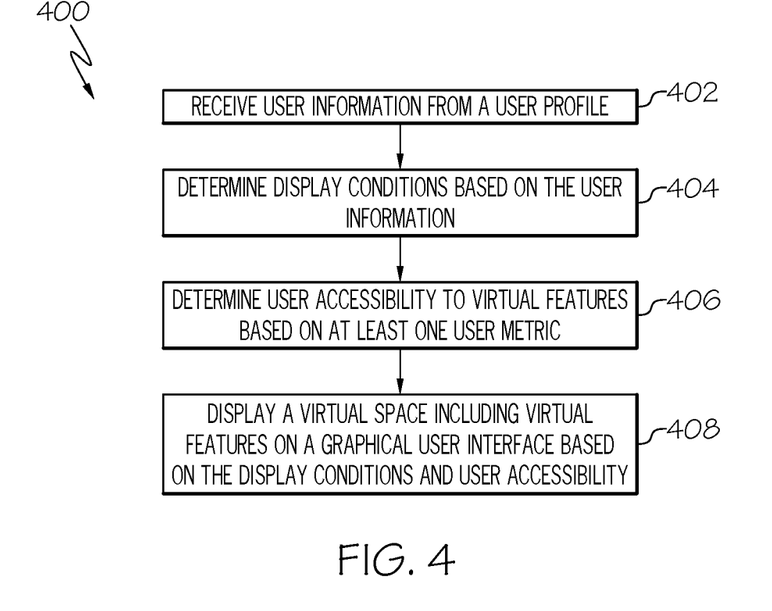
FIG. 4 depicts a flowchart for a method for displaying the virtual space, according to one or more embodiments shown and described herein.

FIG. 4 depicts a flowchart for a method 400 for displaying the virtual space 102, according to one or more embodiments shown and described herein.

Referring now to FIG. 4, a flowchart for the method 400 for displaying the virtual space 102 is depicted. The method 400 includes receiving the user information from the user profile in block 402. As discussed hereinabove, the user information includes the user location, the user design preference, and the at least one user metric. The method 400 further includes determining the display conditions based on the user information in block 404, determining user accessibility to the virtual features based on the at least one user metric in block 406, and displaying the virtual space 102 including the virtual features on the graphical user interface 104 based on the display conditions and the user accessibility in block 408.

The method 400 may include receiving user input. The user input may be received through the user device 111, such as through the graphical user interface 104, the hand controllers 115 of the VR device 112, or the microphone 114. The method 400 may also include connecting to the processor of the user vehicle 134 that may record the plurality of driving metrics. The method 400 may also include unlocking the virtual room based on the at least one user metric.

The method 400 may also include connecting the external user application 122 to the controller 106 and receiving the user application metrics from the external user application 122. The user application metrics may be used to determine the display conditions of the virtual space 102. In some embodiments, the locked virtual room may be accessed/unlocked based on the user application metrics. The user application metrics may relate to a frequency of use of the external user application 122. For example, if the external user application 122 is a ride-sharing service, the user application metrics may include a number of rides the user has ordered from the ride-sharing service. If the user has ordered a number of rides over a threshold number of rides, the method 400 may include unlocking the virtual room. If the external user application 122 is a gaming application, the user application metrics may include a gaming level the user has completed; if the user has completed a gaming level over a threshold gaming level, the method 400 may include unlocking the virtual room.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A computer implemented system for displaying a virtual space, the system comprising:
   a graphical user interface; and
   a controller programmed to:
   receive user information from a user profile, wherein the user information comprises a user location, a user design preference, and at least one user metric, wherein the at least one user metric includes at least one tangible-vehicle metric;
   determine display conditions based on the user information;
   determine user accessibility to virtual features based on the at least one user metric meeting a vehicle threshold condition, wherein the virtual features comprise a locked virtual room, wherein the locked virtual room is within a virtual building; and
   display the virtual space including the virtual features on the graphical user interface based on the display conditions and the user accessibility, wherein the virtual space is displayed as a virtual 3D rendered image.

2. The computer implemented system of claim 1, wherein the at least one user metric is a number of miles a user vehicle has been driven.

3. The computer implemented system of claim 1, wherein the at least one user metric includes a number of consecutive days a user vehicle has been driven.

4. The computer implemented system of claim 1, wherein the at least one user metric includes a location history of a user vehicle.

5. The computer implemented system of claim 4, wherein the user accessibility to the virtual features is based on whether the user vehicle has entered within a defined location.

6. The computer implemented system of claim 1, further comprising an external user application communicatively coupled to the controller.

7. The computer implemented system of claim 1, further comprising a user device, the user device comprising:
   the graphical user interface; and
   the controller.

8. The computer implemented system of claim 7, wherein the user device is a virtual reality device.

9. The computer implemented system of claim 1, wherein the locked virtual room comprises discounts a user can select from.

10. The computer implemented system of claim 1, wherein the user design preference is a preferred architecture.

11. The computer implemented system of claim 10, wherein the virtual space is designed to comprise the preferred architecture.

12. The computer implemented system of claim 1, wherein the display conditions include a weather condition or a time of day.

13. A computer implemented method for displaying a virtual space, the method comprising:
   receiving user information from a user profile, wherein the user information comprises a user location, a user design preference, and at least one user metric, wherein the at least one user metric includes at least one tangible-vehicle metric;
   determining display conditions based on the user information;

determining user accessibility to virtual features based on the at least one user metric meeting a vehicle threshold condition, wherein the virtual features comprise a locked virtual room, wherein the locked virtual room is within a virtual building; and displaying the virtual space including the virtual features on a graphical user interface based on the display conditions and the user accessibility, wherein the virtual space is displayed as a virtual 3D rendered image.

14. The computer implemented method of claim 13, further comprising unlocking a virtual room based on the at least one user metric.

15. The computer implemented method of claim 13, further comprising receiving a user input.

16. The computer implemented method of claim 15, wherein the user input comprises the user design preference.

17. The computer implemented method of claim 15, wherein the user input is received through a user device, wherein the user device is a virtual reality device.

18. The computer implemented method of claim 13, further comprising:
    connecting to an external user application; and
    receiving user application metrics from the external user application.

19. The computer implemented method of claim 13, further comprising connecting to a processor of a user vehicle, wherein the processor of the user vehicle records a plurality of driving metrics.

\* \* \* \* \*